US009900831B2

(12) United States Patent
Immonen et al.

(10) Patent No.: US 9,900,831 B2
(45) Date of Patent: Feb. 20, 2018

(54) METHOD AND APPARATUS FOR MIMO TRANSMISSION

(75) Inventors: Antti Oskari Immonen, Helsinki (FI); Aarno Tapio Parssinen, Espoo (FI)

(73) Assignee: Provenance Asset Group LLC, Essex, CT (US)

( * ) Notice: Subject to any disclaimer, the term of this patent is extended or adjusted under 35 U.S.C. 154(b) by 581 days.

(21) Appl. No.: 12/843,598

(22) Filed: Jul. 26, 2010

(65) Prior Publication Data

US 2012/0020225 A1    Jan. 26, 2012

(51) Int. Cl.
*H04W 28/16* (2009.01)
*H04W 48/18* (2009.01)
*H04B 7/06* (2006.01)
*H04W 88/06* (2009.01)

(52) U.S. Cl.
CPC .......... *H04W 48/18* (2013.01); *H04B 7/0689* (2013.01); *H04W 88/06* (2013.01)

(58) Field of Classification Search
USPC ............ 370/252, 339, 335; 455/452.1, 455.2
See application file for complete search history.

(56) References Cited

U.S. PATENT DOCUMENTS

| | | | |
|---|---|---|---|
| 7,545,874 B1 * | 6/2009 | Tang et al. .................. | 375/267 |
| 7,711,374 B2 * | 5/2010 | Karaoguz et al. ......... | 455/452.2 |
| 8,140,023 B2 * | 3/2012 | Bougard ....................... | 455/68 |
| 2003/0235167 A1 | 12/2003 | Kuffner | |
| 2006/0035653 A1 * | 2/2006 | Karaoguz ............. | H04B 7/043 455/500 |
| 2007/0032246 A1 | 2/2007 | Feher | |
| 2008/0304425 A1 | 12/2008 | Karaoguz | |
| 2009/0168914 A1 * | 7/2009 | Chance et al. ................ | 375/267 |
| 2010/0115528 A1 * | 5/2010 | Piipponen et al. ........... | 718/104 |
| 2010/0210279 A1 * | 8/2010 | Karaoguz et al. ......... | 455/452.2 |
| 2012/0281741 A1 * | 11/2012 | Feher ........................... | 375/219 |

FOREIGN PATENT DOCUMENTS

| | | |
|---|---|---|
| WO | WO-02099995 A2 | 12/2002 |
| WO | 2009083647 A1 | 7/2009 |

OTHER PUBLICATIONS

International Search Report and Written Opinion, received in corresponding Patent Cooperation Treaty Application No. PCT/FI2011/050592, dated Oct. 11, 2011. 12 pages.

* cited by examiner

*Primary Examiner* — Yemane Mesfin
*Assistant Examiner* — Henry Baron (57) ABSTRACT

In accordance with an example embodiment of the present invention, an apparatus for transmission is disclosed comprising a processor configured to receive data and to form data packets, a radio frequency transmitter configured to transmit the data packets, a monitor configured to evaluate resource utilization of the radio frequency transmitter and to provide a resource utilization rate, and a controller, wherein the controller is configured to instruct the processor to form multiple output or single output data packets to the radio frequency transmitter based on the resource utilization rate.

16 Claims, 6 Drawing Sheets

METHOD AND APPARATUS FOR MIMO TRANSMISSION

TECHNICAL FIELD

The technical field relates to wireless communications. More particularly, the technical field relates to multiradio transmitters and methods employing software defined radio techniques to control and configure multiradio hardware in wireless communications.

BACKGROUND

Multiradio mobile devices typically include several different wireless subsystems that enable the use of diverse mobile services, such as the communication of voice, data, and images over diverse wireless networks. Examples of such diverse wireless networks include mobile telephony networks (e.g., Universal Mobile Telecommunications System (UMTS), Global System for Mobile Communication (GSM)), wireless local area networks (WLANs) and WiFi networks, and piconets (e.g., Bluetooth). An example multiradio device may have one radio for voice (or combined voice/data) service over a traditional cellular network and another radio for data communications over another network (e.g., WLAN). A multiradio device may have a WLAN radio for communication with a WLAN access point, a Bluetooth radio for communication with a Bluetooth enabled printer or headset, and a traditional voice service over a cellular telephone radio. A multiradio device may have a GSM radio and a digital video broadcast for handhelds (DVB-H) radio. A multiradio device may have more than one radio for communicating over different cellular telephone networks, such as a mobile telephone having two cellular radios for use with different types of networks in different countries.

Software Defined Radio (SDR) is typically a multiradio mobile device that is controlled by embedded control software. Some of the hardware components of a multiradio device may have their characteristics adjusted by SDR control software. The tuning capabilities in an example SDR may include RF band, RF bandwidth and channel bandwidth. Also, performance related parameters, such as gain and output power affecting for example noise and linearity may be tuned by control software making adjustments to hardware components to accommodate different wireless protocols and different radio conditions.

SUMMARY

Various aspects of examples of the invention are set out in the claims.

According to a first aspect of the present invention, an apparatus for transmission is disclosed comprising a processor configured to receive data and to form data packets, a radio frequency transmitter configured to transmit the data packets, a monitor configured to evaluate resource utilization of the radio frequency transmitter and to provide a resource utilization rate, and a controller, wherein the controller is configured to instruct the processor to form multiple output or single output data packets to the radio frequency transmitter based on the resource utilization rate.

According to a second aspect of the present invention, a method is provided for transmission, comprising receiving data, evaluating a resource utilization rate of a radio frequency transmitter, and depending on the resource utilization rate, transmitting with the radio frequency transmitter either multiple output or single output data packets formed from the received data.

According to a third aspect of the present invention, an apparatus for transmission is disclosed comprising at least one processor and at least one memory including computer program code, wherein the at least one memory and the computer program code are configured, with the at least one processor, to cause the apparatus at least to perform receiving data, evaluating a resource utilization rate of a radio frequency transmitter and depending on the resource utilization rate, transmitting with the radio frequency transmitter either multiple output or single output data packets formed from the received data.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

A SDR hardware (HW) typically consists at least partly of reconfigurable HW resources. The amount of HW resources is an optimization parameter. Typically, an SDR implementation is resource limited, in other words it may not have dedicated resources for simultaneous operation of all radio systems it supports.

Radio systems with multiple receive and/or multiple transmit signal chains (multiple input/multiple output or MIMO) have been employed in order to improve communication performance and increase communications capacity as compared to non-MIMO systems. Such non-MIMO systems are generally referred to as single receive and/or single transmit signal (single input/single output or SISO) systems. From the communications capacity perspective, a MIMO system with T transmit signal chains typically has T independent transmit channels and therefore the increase in the communications capacity is substantially linearly related to the number of transmit signal chains.

An example embodiment of the present invention and its potential advantages are understood by referring to FIGS. 1 through 6 of the drawings.

Figure 1:
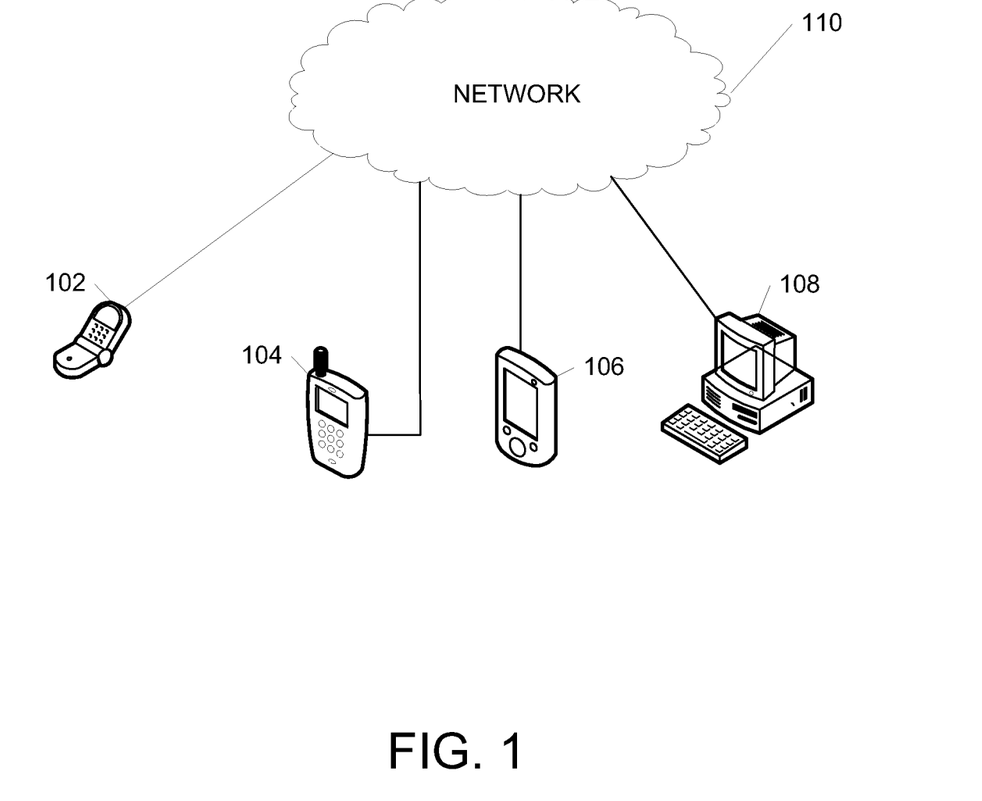
FIG. 1 illustrates a communications system according to an embodiment.

FIG. 1 illustrates an exemplary communication network through which various inventive principles may be practiced. A number of computers and devices including mobile communication devices 102 and 104, personal digital assistant (PDA) 106 and personal computer (PC) 108 may communicate with one another and with other devices through network 110. Network 110 may include wired and wireless connections and network elements, and connections over the network may include permanent or temporary connections. Communication through network 110 is not limited to the illustrated devices and may include additional devices such as a home video storage system, a portable audio/video player, a digital camera/camcorder, a positioning device such as a GPS (Global Positioning System) device or satellite, a mobile television, a set-top box (STB), a digital video recorder, remote control devices and any combination thereof.

Although shown as a single network in FIG. 1 for simplicity, network 110 may include multiple networks that are interlinked so as to provide internetworked communications. The networks serve as access points to further services and networks, such as the Internet. Such networks may include one or more private or public packet-switched networks (e.g., the Internet), one or more private or public circuit-switched networks (e.g., a public switched telephone network), a cellular network configured to facilitate communications to and from mobile communication devices 102-106 (e.g., through use of base stations, mobile switching centers, etc.), a short or medium range wireless communication connection (e.g., Bluetooth®, ultra wideband (UWB), infrared, wireless local area network (WLAN) according to one or more versions Institute of Electrical and Electronics Engineers standard no. 802.11), or a high-speed wireless data network such as Evolution-Data Optimized (EV-DO) networks, Universal Mobile Telecommunications System (UMTS) networks, Long Term Evolution (LTE) networks or Enhanced Data rates for GSM Evolution (GSM/EDGE) networks. Devices 102-108 may use various communication protocols such as Internet Protocol (IP), Transmission Control Protocol (TCP), Simple Mail Transfer Protocol (SMTP) among others known in the art. Various messaging services such as Short Messaging Service (SMS) may also be included.

Figure 2:
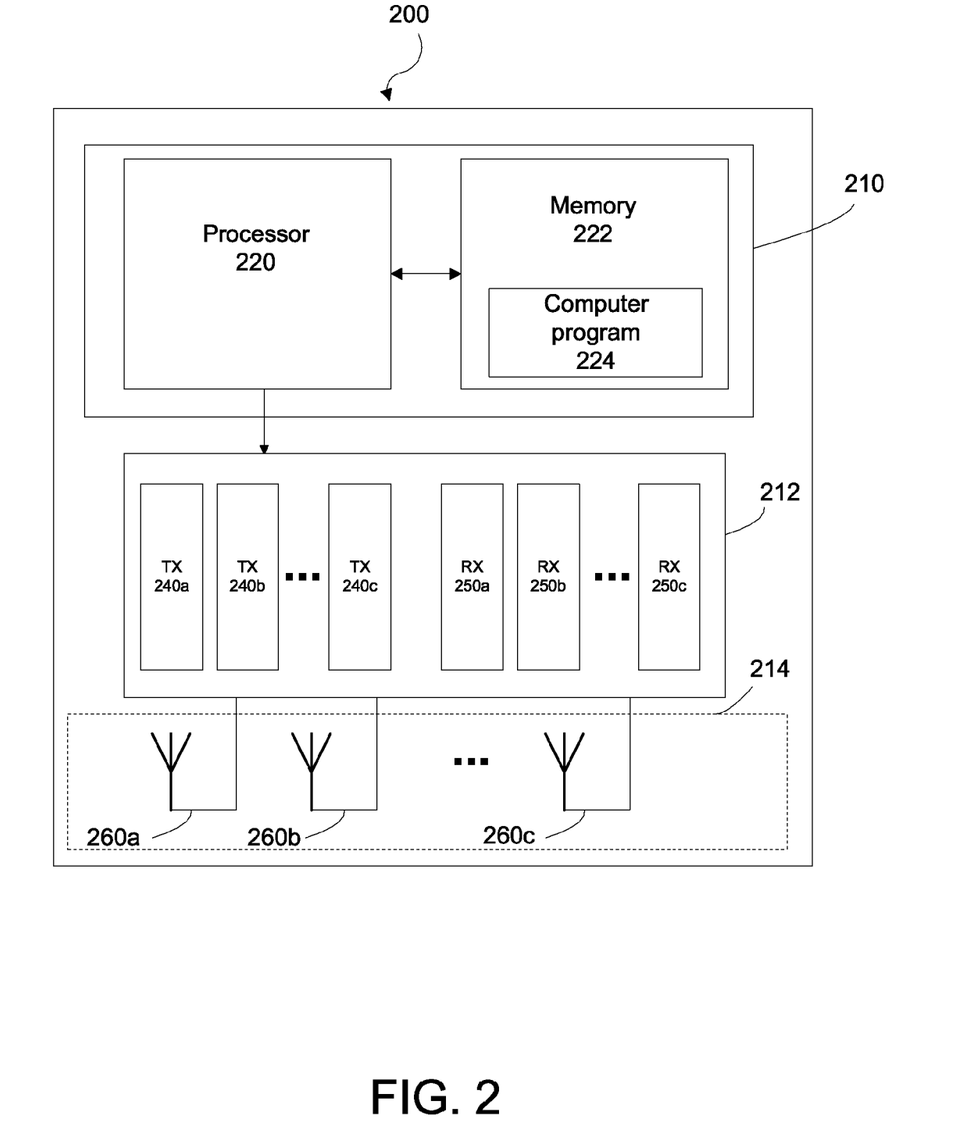
FIG. 2 illustrates an example functional block diagram of a wireless device organized into three sections: the multiradio baseband processing section, the multichannel SDR section and the radio frequency front-end section.

FIG. 2 illustrates an example functional block diagram of a wireless communications multiradio device 200. The wireless device 200 comprises a multiradio baseband processing (BB) section 210, a multichannel radio frequency (RF) software defined radio (SDR) section 212, and a RF front-end section 214. The BB section 210 may be implemented by at least one chipset with one or more processors. It is to be noted that current multi-radio devices typically have multiple baseband modules, which may form the BB section 210 illustrated in FIG. 1. Alternatively, there could be a single baseband unit, such as a multi-core vector processor sub-system capable of performing baseband computation of multiple radio systems simultaneously. The BB section 210 includes one or more processors (CPUs, vector processors or similar) 220 to handle repetitive, parallel, baseband processing algorithms and a memory 222. The processors 220 are programmed with computer program instructions 224 stored in the memory 222, to operate in accordance with the example processes depicted in the flow diagrams 400, 500 of FIGS. 4 and 5, respectively.

The SDR section 212 comprises one or more integrated circuits customized to perform the functions of the multichannel radio frequency software defined radio. In this example embodiment, the SDR section 212 may comprise a single application-specific integrated circuit (ASIC) or it may comprise several ASICs. On the other hand, in a more integrated solution, the BB section 210 and the SDR section 212 may also be implemented on a single ASIC. Another possibility is that the BB section 210 and the SDR section are implemented on separate dies but combined into a single multi-chip module. The SDR section 212 is connected to a radio frequency (RF) front-end (FE) section 214. The RF FE section 214 typically comprises one or more band-pass filters and one or more antennas 260a-260c.

In an embodiment, when an application requests communication services from the wireless device 200, information is gathered about ambient wireless communication protocols, an appropriate protocol for the requested communication is selected and the multiradio hardware components in the wireless device 200 are configured for optimum performance in the requested communications session. The example embodiments can handle a requested communications service that involves two or more concurrent sessions using two or more communications protocols, such as downloading a file over a 3GPP cellular network and transferring the downloaded file via a WLAN link to a personal computer. The example embodiments select communication protocols that can be run concurrently for the requested communications and configure the multiradio hardware components in the wireless device 200 to handle the two or more concurrent sessions. However, it will be appreciated that the application of the present embodiments is not limited to application of any particular radio system, and presently disclosed multi-radio scheduling features may be applied with any suitable current or future standard or non-standard wireless communication radio systems.

In order to control co-existence of different radio access systems, the wireless communications device 200 may comprise a multi-radio controller (MRC). Such MRC may function as a scheduling service controller for providing protocol level radio access scheduling services for a plurality of radio access systems over a predefined control interface. When a radio system needs to receive or transmit, it asks for air access time by sending a schedule request to the MRC. The MRC collects requests from different radio systems, solves possible interoperability problems and sends decisions back to the radio systems. Such MRC may be implemented by computer program instructions 224 executed by a processor of BB 210, for instance. The use of such multiradio scheduling enables more efficient radio resource usage.

The SDR section 212 may comprise dynamically reconfigurable transmitter resources 240a-240c and receiver resources 250a-250c, which are illustrated in a simplified form in FIG. 2. The reconfigurable transmitting resources may be selected and/or multiplexed to form desired transmit signal chains. Examples of transmitting resources may include baseband amplifiers, filters, frequency conversion mixers, I/Q or polar modulators, variable gain amplifiers and frequency synthesizers for local oscillator signal generation. Typically, such a SDR section 212 is resource limited and can support only a predetermined amount of transmit signal chain requirements at a time. There may be some dedicated resources for some radio systems, but typically at least a part of the transmit resources in the SDR section 212 can be configured to support more than one radio system.

The wireless communication device 200 may for example be configured to operate in a cellular network, such as GSM or UMTS, and at the same time communicate over WLAN and Bluetooth, for instance. As an example, let us assume that the SDR section 212 comprises resources for three independent transmit (TX) signal chains. In an exemplary use case, such SDR with three TX signal chains could be configured to support UMTS with one TX chain, WLAN 802.11g with one TX chain and Bluetooth with one TX chain. Now, if the use case situation changes and for example Bluetooth communication would not be required anymore, those transmit signal chain resources would be free for other transmission purposes.

In an embodiment, the wireless communication device 200 is capable of supporting MIMO communication pursuant to IEEE standard 802.11n-2009. The 802.11n standard specifies enhancements to IEEE 802.11 physical layer (PHY) and medium access control (MAC) sublayer to provide modes of operation with useful data rates substantially higher than those previously available. MIMO technique is utilized to provide significantly higher IEEE 802.11 wireless local area network (WLAN) throughput in comparison to single input/single output operation. In general, number of simultaneous data streams is limited by the number of signal chains capable of transmission in the multiradio device 200. The 802.11n standard specifies options up to four simultaneous transmit data streams.

The number of transmit signal chains in a multiradio device with dedicated signal chains is typically defined as the sum of all individually supported radio transmission modes. For instance, if the multiradio device 200 supports 2×MIMO transmission scheme of 3GPP LTE standard, 2×MIMO transmission scheme of WLAN 802.11n and Bluetooth, it typically needs to have five transmit signal chains. On the other hand, if the device does not need to support all radio systems simultaneously, the same implementation with a resource limited SDR may be more economical. For instance, such an implementation with a SDR HW that has four reconfigurable transmit signal chains may be capable of supporting two transmit data streams of LTE and two transmit data streams of WLAN 802.11n whenever Bluetooth operation is not required.

In an embodiment, the protocol software executed by a processor of BB section 210 receives data from an application running in the wireless communication device and forms data packets to be transmitted. Let us assume that the apparatus is first configured to provide two cellular transmit data streams according to e.g. the LTE standard plus one WLAN transmit data stream. In this example, it is considered that LTE transmission has higher priority over WLAN. The priorities may be different, for example if data connections over WLAN are preferred. For instance, WLAN could be preferred in high data throughput applications over LTE or other cellular systems.

Figure 3:
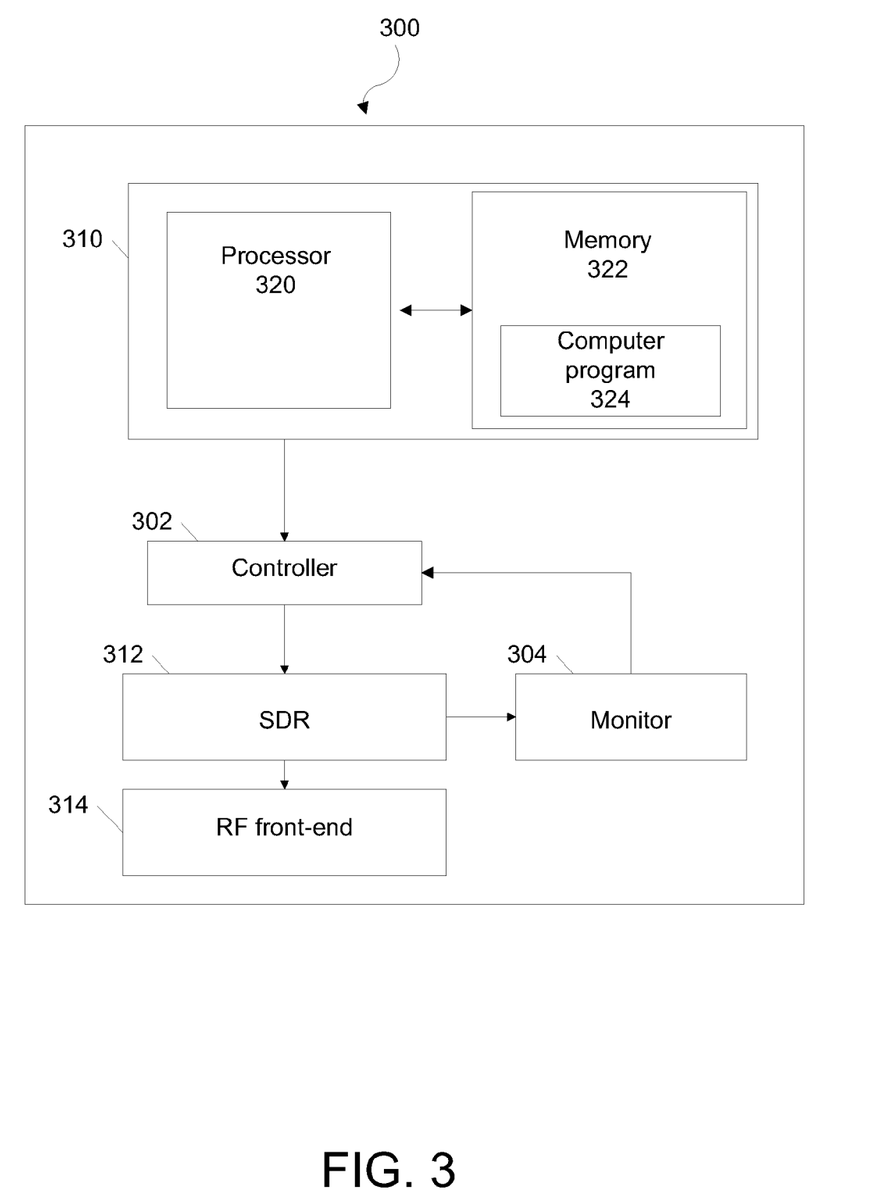
FIG. 3 illustrates a functional block and circuit diagram of the wireless device according to an embodiment.

FIG. 3 illustrates an example embodiment of a wireless communications device 300. A monitor 304 in the wireless communication device 300 is configured to evaluate resource utilization of the radio transmitter resources of a SDR section 312 and to provide a resource utilization rate. Although the monitor 304 has been illustrated as one entity, different units and memory thereof may be implemented in one or more physical or logical entities. For instance, the monitor 304 may have a distributed implementation, for example if the SDR section 312 comprises more than one ASIC. One or more of the ASICs may have their own monitors 304. Alternatively, the monitor 304 may be implemented on the same ASIC with a BB section 310.

In an embodiment, a controller 302 is configured to receive the resource utilization rate. If the resource utilization rate of the SDR section 312 indicates that the SDR section may have enough resources for transmitting multiple WLAN data streams, the WLAN protocol software executed by the processor 320 of BB section 310 is instructed to form both multiple output and single output data packets. The controller is coupled to an output of the processor 320. An output of the monitor 304 is coupled to the controller 302. Depending on the resource utilization rate value provided by the monitor 304, the controller 302 will latch either multiple output or single output data packets to the SDR section 312 for transmission. For instance, if WLAN has lower priority than e.g. LTE, with this example embodiment idle time slots where LTE does not use the resource can be better utilized for WLAN. If both multiple output and single output data packets are provided for transmission, the controller 302 can perform the latching of either multiple output or single output data packets just before the transmission takes place. In this embodiment, the controller 302 receives multiple output and single output data packets from the BB 310 and depending on the resource utilization rate of the SDR section 312, makes the latching decision. The data to be transmitted may be split into as many parallel streams as the potentially available transmit chains in the SDR section 312 and the communication system/standard allows.

Figure 4:
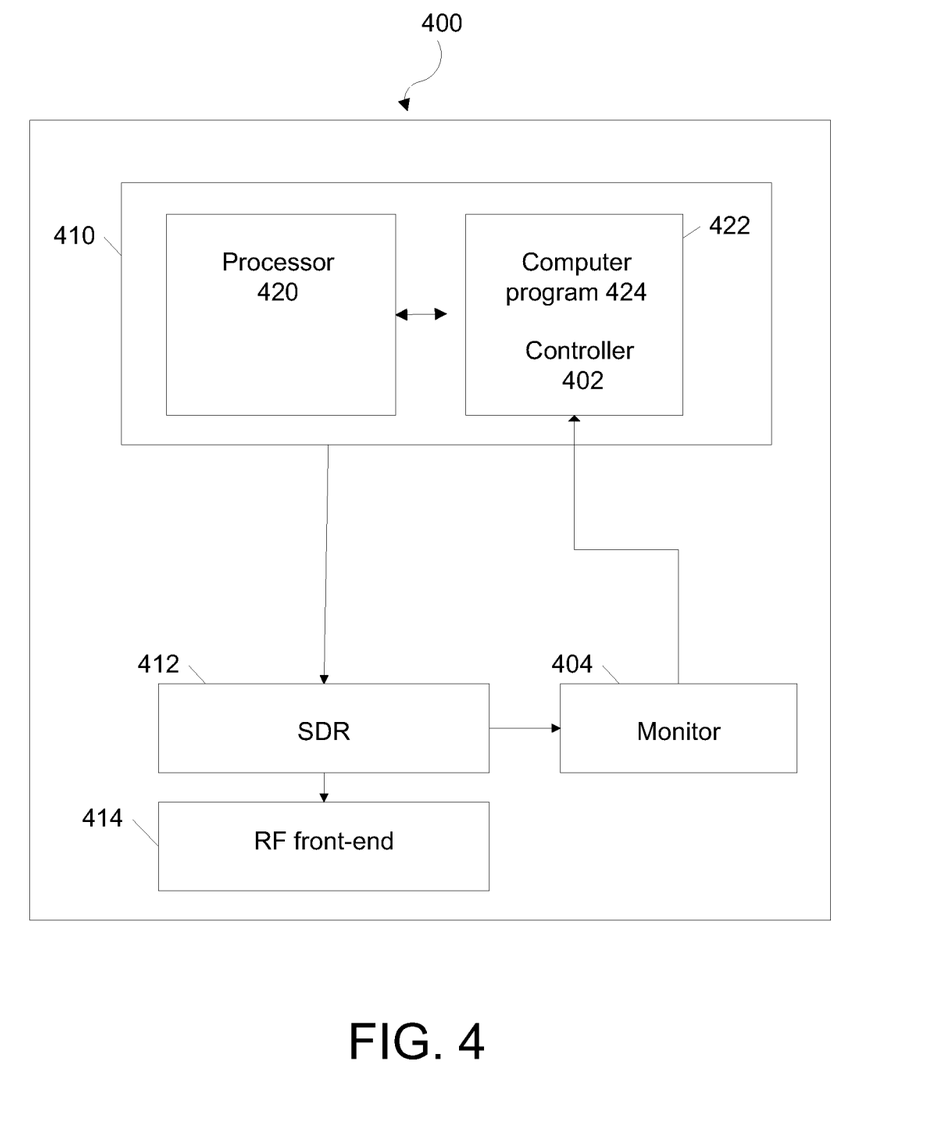
FIG. 4 illustrates a functional block and circuit diagram of the wireless device according to an embodiment.

FIG. 4 illustrates another example embodiment, where the controller 402 is implemented as part of the computer program instructions 424 of the processor 420 and stored in the memory 422. The controller 402 is configured to receive the resource utilization rate from the monitor 404. Based on the resource utilization rate provided by the monitor 404 to the controller 402, the controller instructs the processor 420 to form either multiple output or single output WLAN data packets. If the resource utilization rate of the SDR section 412 indicates that the SDR section may have enough resources for transmitting multiple WLAN data streams, the WLAN protocol software executed by the processor BB 410 is instructed to form multiple output data packets. In this embodiment, the data to be transmitted is split into multiple parallel data streams. The number of parallel packet data streams is defined by the available signal chain resources for transmission; it may be two or more. If the resource utilization rate indicates that multiple data stream transmission is not possible, for instance due to higher priority transmissions by other radio systems, the controller 402 may instruct the WLAN protocol software executed by the processor 420 of BB 410 to create only single output data packets. In this example embodiment, the controller 402 is functionally configured to instruct the protocol level software of the BB section 410 before the data packets are generated.

Figure 5:
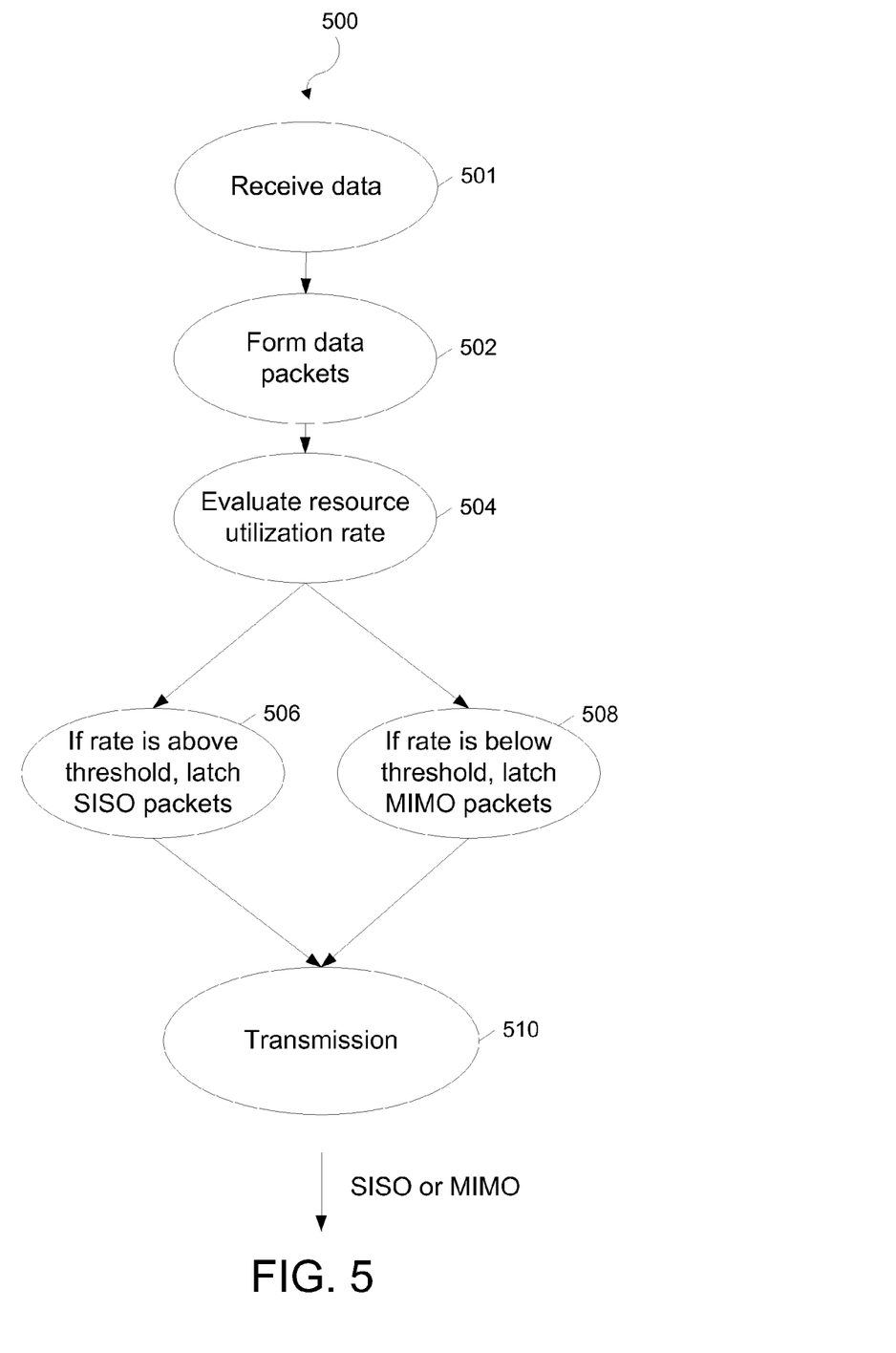
FIG. 5 illustrates a flowchart according to an embodiment depicting an example process carried out by the wireless device.

FIG. 5 illustrates a flow diagram 500 of an example embodiment of the process in an example wireless communications device 300. The blocks of the flow diagram represent computer code instructions stored in the memory 322 of the wireless device 300, which when executed by the processor 320, carry out the functions of the example embodiments of the invention. These blocks are illustrated in a simplified form. The blocks may be carried out in another order than shown and individual blocks may be combined or separated into component blocks. This example method may enable local control over utilization of MIMO transmission within the multiradio device 300 based on the resource availability of the SDR section 312. The blocks of the example method 500 are as follows.

Block 501: receiving data;
Block 502: forming multiple and single output data packets;
Block 504: evaluating a resource utilization rate of a radio frequency transmitter;
Block 506: if the resource utilization rate is above a threshold value, latching single output (SISO) data packets;
Block 508: if the resource utilization rate is below a threshold value, latching multiple output (MIMO) data packets;
Block 510: transmitting the data packets.

Figure 6:
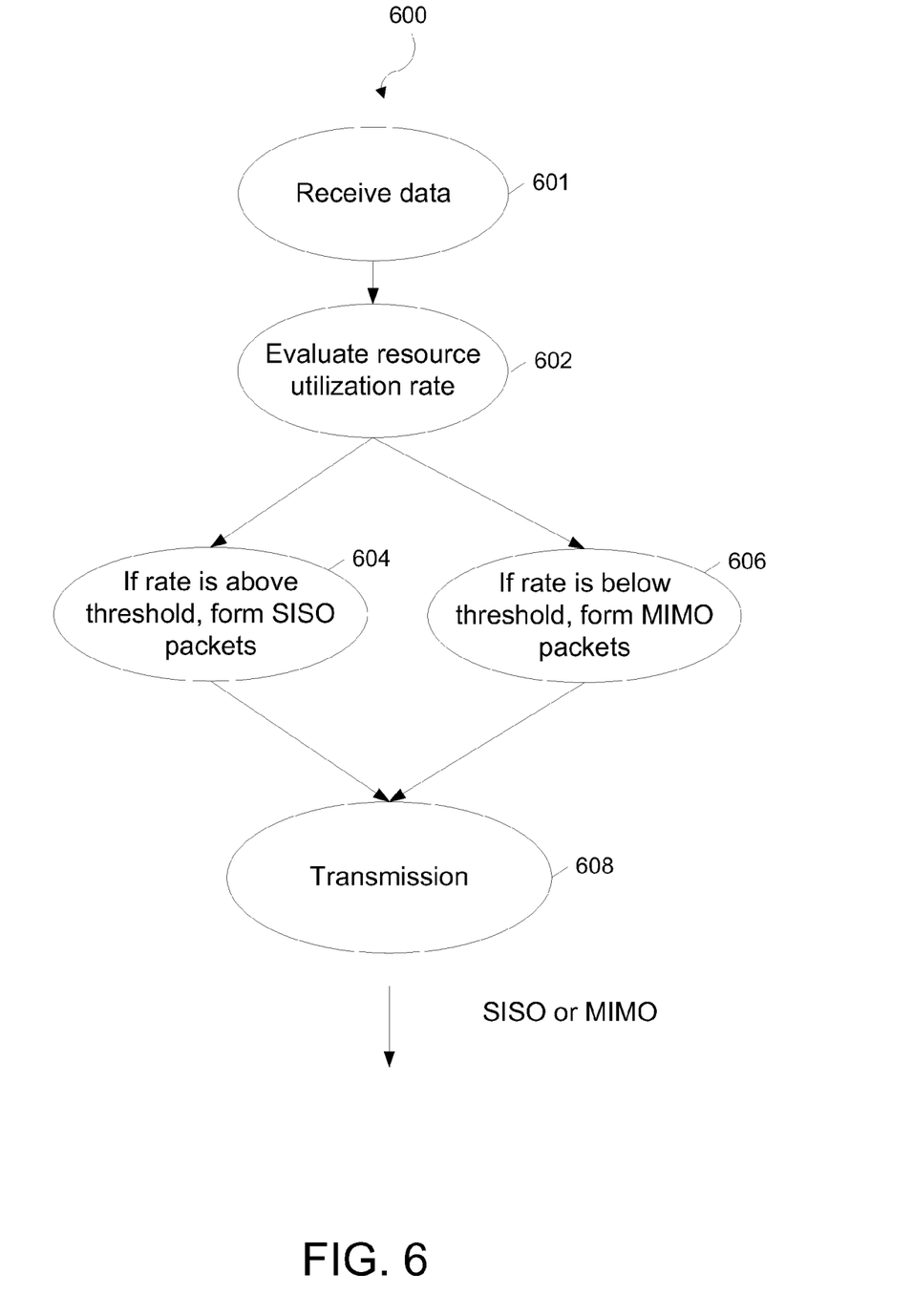
FIG. 6 illustrates a flowchart according to another embodiment depicting an example process carried out by the wireless device.

FIG. 6 illustrates a flow diagram 600 of an example embodiment of the process in an example wireless communications device 400. The blocks of the flow diagram represent computer code instructions stored in the memory 422 of the wireless device 400, which when executed by the processor 420, carry out the functions of the example embodiments of the invention. These blocks are illustrated in a simplified form. The blocks may be carried out in another order than shown and individual blocks may be combined or separated into component blocks. This example method may enable local control over utilization of MIMO transmission within the multiradio device 400 based on the resource availability of the SDR section 412. The blocks of the example method 600 are as follows.

Block 601: receiving data;

Block 602: evaluating a resource utilization rate of a radio frequency transmitter;

Block 604: if the resource utilization rate is above a threshold value, forming single output (SISO) data packets;

Block 606: if the resource utilization rate is below a threshold value, forming multiple output (MIMO) data packets;

Block 608: transmitting the data packets;

Although the presented example embodiments used WLAN 802.11n and LTE as example radio systems, the embodiments apply equally to any MIMO capable system.

Without in any way limiting the scope, interpretation, or application of the claims appearing below, a technical effect of one or more of the example embodiments disclosed herein may be improved data throughput, especially when a MIMO-enabled radio system has lower priority with respect to other radio systems in a multiradio communications device. Another technical effect of one or more of the example embodiments disclosed herein may be reduced amount of hardware in multiradio applications supporting MIMO concepts.

It should be understood that any of the method blocks, procedures or functions described herein may be implemented using one or more processors in combination with executable instructions that cause the processors and other components to perform the method blocks, procedures or functions. As used herein, the terms "processor" and "computer" whether used alone or in combination with executable instructions stored in a memory or other computer-readable storage medium should be understood to encompass any of various types of well-known computing structures including but not limited to one or more microprocessors, special-purpose computer chips, field-programmable gate arrays (FPGAS), controllers, application-specific integrated circuits (ASICS), application logic, combinations of hardware/firmware, or other special or general-purpose processing circuitry. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. An apparatus, comprising:
at least one processor;
memory storing computer program code;
wherein the memory storing the computer program code is configured to, with the at least one processor, cause the apparatus to at least:
receive, by a baseband section of a software defined radio, data to be transmitted by the software defined radio, wherein the software defined radio comprises a plurality of radio frequency transmitter resources configured for transmission of data packets;
form, by the baseband section, a plurality of both single and multiple output packets for the data;
monitor, by a monitor, resource utilization of the software defined radio, to determine a total resource utilization rate value, wherein the resource utilization rate value indicates a rate at which resources are being used by the software defined radio, and wherein the resource utilization rate value indicates the rate at which resources are being used over all of the radio transmitter frequency resources of the plurality of radio frequency transmitter resources;
receive, by a controller, the single output and multiple output packets from the baseband section and the resource utilization rate; and
determine, by the controller, based on the resource utilization rate value, whether data packets to be latched for transmission by the software defined radio are to be multiple output or single output data packets and to latch the data packets accordingly.

2. The apparatus of claim 1, wherein
if the resource utilization rate is above a threshold value, single output data packets are latched for transmission by the radio frequency transmitter; and
if the resource utilization rate is below the threshold value, multiple output data packets are latched for transmission by the software defined radio.

3. The apparatus of claim 2, wherein formation of multiple output data packets stops when the resource utilization is above the threshold value.

4. The apparatus of claim 2, wherein formation of single output data packets stops when the resource utilization is below the threshold value.

5. The apparatus of claim 1, wherein the plurality of radio frequency transmitter resources are configured to transmit at least two data streams having different priorities.

6. The apparatus of claim 5, wherein the plurality of radio frequency transmitter resources are assigned to different radio standards based on the priorities.

7. A method, comprising:
receiving, by a baseband section of a software defined radio, data to be transmitted by the software defined radio, wherein the software defined radio comprises a plurality of radio frequency transmitter resources configured for transmission of data packets;
forming, by the baseband section, a plurality of both single and multiple output packets for the data;
monitoring, by a monitor, a resource utilization rate of the software defined radio, to determine a resource utilization rate value, wherein the resource utilization rate value indicates a rate at which resources are being used by the software defined radio, and wherein the resource utilization rate value indicates the rate at which resources are being used over all of the radio transmitter frequency resources of the plurality of radio frequency transmitter resources;

receiving, by a controller, the single output and multiple output packets from the baseband section and the resource utilization rate;

determining, by the controller, based at least in part on the resource utilization rate value, whether data packets to be latched for transmission by the software defined radio are to be multiple output or single output data packets and latching the data packets accordingly; and transmitting the latched data packets.

8. The method of claim 7, wherein
if the resource utilization rate is below a threshold value, multiple output data packets are latched; and
if the resource utilization rate is above a threshold value, single output data packets are latched.

9. The method of claim 7, wherein
if the resource utilization rate is below a threshold value, multiple output data packets are transmitted; or
if the resource utilization rate is above a threshold value, single output data packets are transmitted.

10. The method of claim 7, wherein the plurality of radio frequency transmitter resources are configured to transmit at least two data streams, the method further comprising assigning different priorities to the at least two data streams.

11. The method of claim 10, wherein assigning different priorities to the at least two data streams is based on the priorities of different radio standards.

12. A computer-readable non-transitory medium encoded with instructions that, when executed by a computer, cause an apparatus at least to perform:

receive, by a baseband section of a software defined radio, data to be transmitted by the software defined radio, wherein the software defined radio comprises a plurality of radio frequency transmitter resources configured for transmission of data packets;

form, by the baseband section, a plurality of both single and multiple output packets for the data;

monitoring, by a monitor, a resource utilization rate of the software defined radio, to determine a resource utilization rate value, wherein the resource utilization rate value indicates a rate at which resources are being used by the software defined radio, and wherein the resource utilization rate value indicates the rate at which resources are being used over all of the radio frequency transmitter resources of the plurality of radio frequency transmitter resources;

receive, by a controller, the single output and multiple output packets from the baseband section and the resource utilization rate; and determine, by the controller, based on the resource utilization rate value, whether data packets to be latched for transmission by the by the software defined radio are to be multiple output or single output data packets and to latch the data packets accordingly.

13. The apparatus of claim 1, wherein determining a resource utilization rate value representing the resource utilization rate of a radiofrequency transmitter comprises monitoring a utilization rate of dynamically configurable transmitter resources.

14. The method of claim 9, wherein formation of multiple output data packets stops when the resource utilization is above the threshold value.

15. The method of claim 9, wherein formation of single output data packets stops when the resource utilization is below the threshold value.

16. The method of claim 9, wherein determining a resource utilization rate value representing the resource utilization rate of a radiofrequency transmitter comprises monitoring a utilization rate of dynamically configurable transmitter resources.

* * * * *